UNITED STATES PATENT OFFICE.

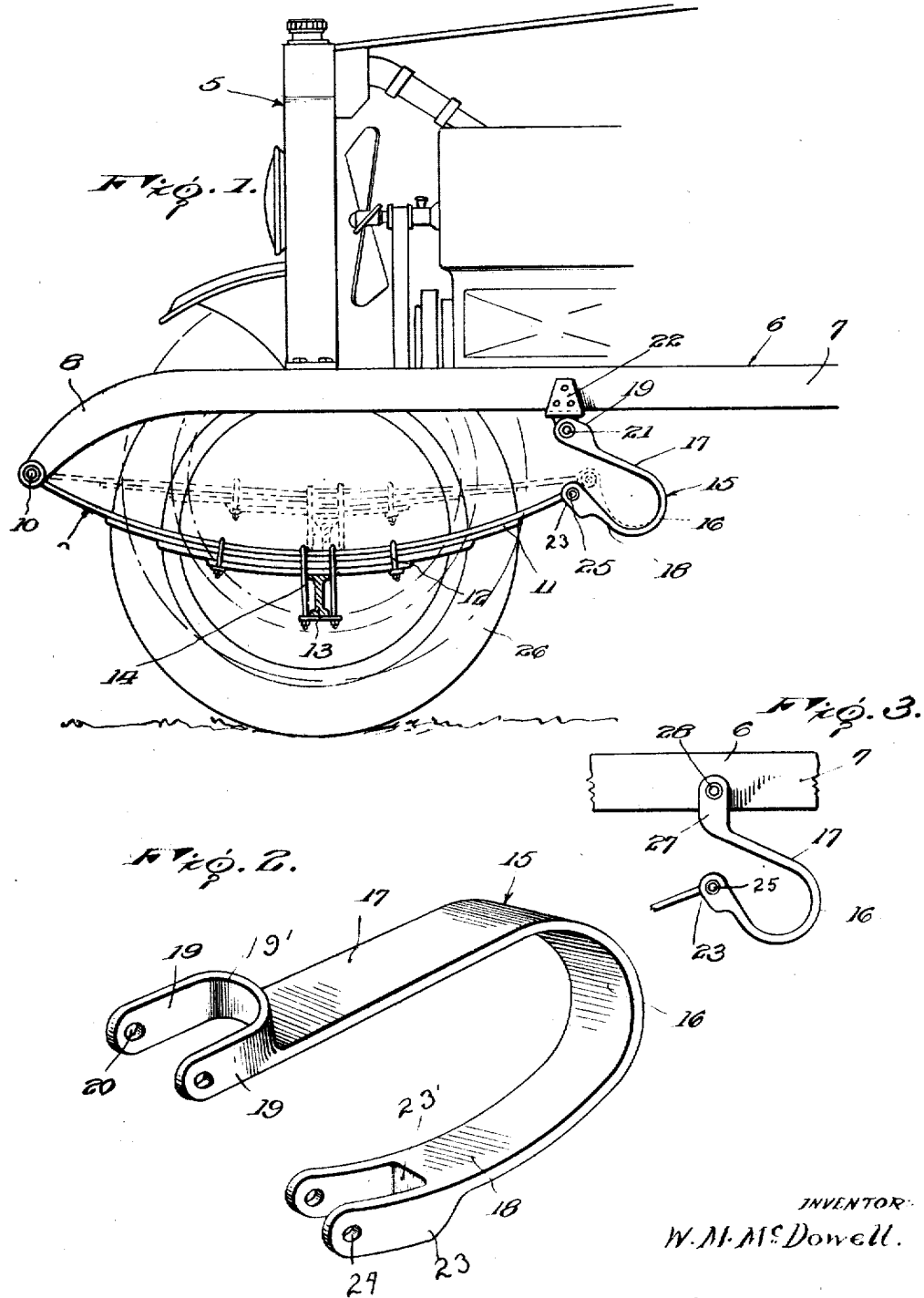
W. M. McDOWELL.
SHOCK ABSORBER.
APPLICATION FILED NOV. 6, 1919.
1,354,980.   Patented Oct. 5, 1920.
INVENTOR
W. M. McDowell.

WILLIE M. McDOWELL, OF TACOMA, WASHINGTON.

SHOCK-ABSORBER.

1,354,980.                    Specification of Letters Patent.         Patented Oct. 5, 1920.

Application filed November 6, 1919. Serial No. 336,128.

*To all whom it may concern:*

Be it known that I, WILLIE M. McDOWELL, a citizen of the United States, residing at Tacoma, in the county of Pierce and State of Washington, have invented certain new and useful Improvements in Shock-Absorbers, of which the following is a specification.

This invention relates to improvements in shock absorbers especially adapted for use on the front springs of motor vehicles.

An important object of this invention is to provide a shock absorber of the class described having novel means for spacing the same from the vehicle frame during operation whereby the device may spring to its fullest extent.

A further object of the invention is to provide a shock absorber especially adapted for use in connection with the front springs of a motor vehicle and provided with novel means to permit of the longitudinal extension and vertical movement of the elliptical springs when the front wheels of the vehicle encounter an inequality in the road.

A further object of the invention is to provide a shock absorber which may be readily applied to a motor vehicle without any alteration in the construction of the vehicle.

A further object of the invention is to provide a shock absorber of the class described which is efficient, of highly simplified construction and cheap to manufacture.

Other objects and advantages will be apparent during the course of the following description.

In the accompanying drawing forming a part of this application and in which like numerals are employed to designate like parts throughout the same:

Figure 1 is a fragmentary side elevation of a vehicle having the improved shock absorber applied;

Fig. 2 is a perspective of the improved shock absorber detached;

Fig. 3 is a side elevation of the shock absorber having a slightly modified form of attaching means.

In the drawing wherein for the purpose of illustration is shown several preferred embodiments of the invention, the numeral 5 generally designates a motor vehicle having a chassis 6. The chassis 6 is provided with longitudinally extending side bars 7 having their forward end portions 8 extended downwardly and connected to semi-elliptical leaf springs 9 through the medium of spring bolts 10. The elliptical spring 9 includes superposed leaves 11 connected by spring clips 12. As illustrated in Fig. 1, the intermediate portion of the semi-elliptical spring 9 is mounted on the front axle 13 and is secured to the same by a pair of U-shaped axle clips 14.

The invention herein disclosed includes a shock absorber 15 formed from a length of highly tempered spring metal bowed intermediate its ends as indicated at 16 to provide upper and lower arms 17 and 18, respectively. The forward end portion of the upper arm 17 is bifurcated to provide a pair of attaching ears 19 which as illustrated in Fig. 2 are provided with alined openings or apertures 20 adapted to receive a pivot bolt 21 of a bracket 22. The ears 19 of the upper arm 17 are twisted or bent so as to dispose their side edges upwardly whereby the ears are reinforced to prevent breaking of the upper arm 17. As illustrated in Fig. 2 the inner edges of the spaced apertured ears 19 are flush with the inner face of the arm 17 and the outer edges of said ears are arranged outwardly of the outer face of the arm and in parallel relation to the same. The rear ends of the ears 19 are formed integral with a longitudinally curved upstanding flange 19' which serves as an efficient means for strengthening and reinforcing said ears. The upstanding flange 19' is, of course, formed integral with the arm 17 and extends transversely of the same. The lower arm 18 has its forward end portion bifurcated to provide a pair of ears 23 which are arranged in spaced parallel relation and are provided with apertures 24 adapted for the reception of a pivot bolt 25 extended through the rear end portion of the leaf spring 9. As in the case of the ears 19, the ears 23 are twisted to strengthen and reinforce their connection with the adjacent portion of the lower arm 18. The ears 23 are also strengthened and reinforced by a transversely extending flange 23' similar in construction to the upstanding flange 19'.

With reference to Fig. 1, it will be noted that the upper arm 17 has its ears 19 arranged in advance of the ears 23 whereby the bowed portion 16 of the shock absorber is extended downwardly for arranging the entire device at an angle of about 45°. As is the case in most motor vehicles employing semi-elliptical front springs, the pivot bolt 25 of the leaf spring is disposed directly beneath or in the vertical plane of the pivot bolt 21 and is connected to the same by a conventional link shackle. In arranging the shock absorber at an inclination of approximately 45°, the same is prevented from contacting with the under side of the chassis when the leaf spring is moved upwardly upon the engagement of the front wheels 26 with an inequality in the road. Also in arranging the device in an inclined position, the spring upon being moved upwardly is free to assume its extended position as clearly illustrated in dotted lines in Fig. 1. In addition to partaking of a slight vertical movement during the action of the leaf spring, the lower arm 18 of the shock absorber partakes of a slight rearward movement and therefore permits the spring to readily assume the position illustrated in dotted lines in Fig. 1.

In the form of the invention illustrated in Fig. 3 the upper arm 17 is provided with a pair of upwardly extending spaced parallel apertured ears 27 which are adapted to be arranged on opposite sides of the side bars 7 of the chassis. The apertured ears 27 are connected by a pivot bolt 28 to the side bar 7 and in this manner dispense with the bracket 22.

As illustrated in the several figures and specifically in Fig. 1, it will be noted that the lower arm 18 has its forward end portion extended inwardly in the direction of the forward end of the upper arm 17 whereby when the rear end of the semi-elliptical spring is extended, the arm may partake of a free movement.

With reference to Figs. 1 and 3, it will be noted that the bowed portion 16 of the shock absorber is disposed below the pivot elements at the forward ends of the arm and by this construction the semi-elliptical leaf spring is permitted to more freely yield under strain.

In the practice of the invention, the semi-elliptical spring is moved upwardly when the front wheels encounter an inequality in the road and simultaneously with the upward movement of the spring, the same is extended to the dotted line position illustrated in Fig. 1. The lower arm 18 of the shock absorber is accordingly moved upwardly and rearwardly and alleviates to an appreciable extent the shock and vibration on a machine and the occupants of the same.

It is to be understood that the forms of the invention herewith shown and described are to be taken as preferred embodiments of the same and that such minor changes may be made as will remain within the spirit of the invention and the scope of what is claimed.

Having thus described the invention, what is claimed as new is:

1. A shock absorber including a pair of spring arms having their rear end portions connected, said arms being of unequal lengths and having their forward end portions provided with means for connection with vertically spaced pivots whereby said spring arms are inclined downwardly from the pivot points when attached.

2. The combination with relatively stationary and resilient bodies having pivot elements normally disposed in the same vertical plane, of a shock absorber arranged between said stationary and resilient bodies and provided with upper and lower arms, the forward end portions of said arms being provided with attaching means secured to said vertically spaced pivot elements, said upper arm being of greater length than said lower arm, whereby the shock absorber is inclined downwardly from said stationary body.

3. As an article of manufacture, a shock absorber including a pair of flat spring arms, pairs of spaced ears formed integral with said arms and having their inner edges flush with the inner faces of said arms and their outer edges disposed outwardly of and parallel to the outer faces of said arms and each pair of ears being formed integral for strengthening and reinforcing the same.

4. The combination with relatively stationary and resilient bodies having pivot elements normally disposed in the same vertical plane, of a shock absorber arranged between said stationary and resilient bodies and provided with upper and lower spring arms and a bowed connecting portion, the forward portions of said spring arms being provided with attaching means secured to said vertically spaced pivot elements, the bowed portion of said shock absorber being disposed below the vertically spaced pivot elements so as to permit of the free movement of said lower arm, said upper arm being of greater length than said lower arm whereby the shock absorber is inclined downwardly from said stationary body.

In testimony whereof I affix my signature.

WILLIE M. McDOWELL. [L. S.]